(12) United States Patent
Zhang

(10) Patent No.: US 10,506,624 B2
(45) Date of Patent: Dec. 10, 2019

(54) SCHEDULING METHOD AND DEVICE IN UE AND BASE STATION

(71) Applicant: Shanghai Langbo Communication Technology Company Limited, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 15/856,093

(22) Filed: Dec. 28, 2017

(65) Prior Publication Data

US 2018/0124817 A1 May 3, 2018

Related U.S. Application Data

(63) Continuation of application No. PCT/CN2017/071299, filed on Jan. 16, 2017.

(30) Foreign Application Priority Data

Jan. 24, 2016 (CN) .......................... 2016 1 0045838

(51) Int. Cl.
*H04W 72/12* (2009.01)
*H04L 1/18* (2006.01)

(52) U.S. Cl.
CPC ....... *H04W 72/1273* (2013.01); *H04L 1/1812* (2013.01); *H04L 1/1861* (2013.01); *H04W 72/1289* (2013.01)

(58) Field of Classification Search
CPC ............ H04L 1/1812; H04W 72/1289; H04W 72/1273
See application file for complete search history.

(56) References Cited

U.S. PATENT DOCUMENTS 9,462,587 B2 10/2016 Seo et al.
9,655,091 B2 5/2017 Papasakellariou et al.
(Continued)

FOREIGN PATENT DOCUMENTS

CN 101043718 A 9/2007
CN 101282166 A 10/2008
(Continued)

OTHER PUBLICATIONS

"3rd Generation Partnership Project; Technical Specification Group Radio Access Network; Physical Channels and Modulation," 3GPP TS 36.211 V0.2.2, pp. 1-26 (Dec. 31, 2006).

(Continued)

*Primary Examiner* — Benjamin H Elliott, IV
(74) *Attorney, Agent, or Firm* — Maschoff Brennan

(57) ABSTRACT

A scheduling method and device in UE and base station is provided. The UE receives a first signaling and receives a wireless signal on a target time frequency resource. The first signaling indicates a first time frequency resource, and the first time frequency resource includes a second time frequency resource. The target time frequency resource includes a time frequency resource of the first time frequency resource except the second time frequency resources. The target and the second time frequency resource are orthogonal, or the first signaling indicates whether the target time frequency resource includes the second time frequency resource. The first time frequency resource includes T1 sub frames in a time domain and P1 sub carriers in a frequency domain. The second time frequency resource includes T2 sub frames out of the T1 sub frames in a time domain. T1 and P1 are positive integer, T2 is smaller than T1.

16 Claims, 6 Drawing Sheets

(56) References Cited

U.S. PATENT DOCUMENTS

| | | | |
|---|---|---|---|
| 9,980,256 B2 | 5/2018 | Zhao et al. | |
| 2001/0041537 A1* | 11/2001 | Simonsson | H04L 1/20 455/67.11 |
| 2005/0220042 A1 | 10/2005 | Chang et al. | |
| 2008/0095106 A1* | 4/2008 | Malladi | H04L 5/0007 370/329 |
| 2013/0308587 A1* | 11/2013 | Zhang | H04L 25/03159 370/329 |
| 2013/0315180 A1 | 11/2013 | Papasakellariou et al. | |
| 2014/0003302 A1 | 1/2014 | Han et al. | |
| 2014/0036856 A1 | 2/2014 | Park | |
| 2017/0093540 A1* | 3/2017 | Lei | H04L 5/0044 |
| 2017/0094547 A1* | 3/2017 | Yum | H04W 72/04 |
| 2017/0272222 A1* | 9/2017 | Froberg Olsson | H04L 5/0051 |
| 2018/0124817 A1* | 5/2018 | Zhang | H04W 72/1273 |
| 2018/0270803 A1* | 9/2018 | Kwak | H04W 56/00 |
| 2018/0287761 A1* | 10/2018 | You | H04L 5/00 |
| 2019/0007958 A1* | 1/2019 | Zhang | H04W 72/1268 |

FOREIGN PATENT DOCUMENTS

| | | |
|---|---|---|
| CN | 101378306 A | 3/2009 |
| CN | 101483914 A | 7/2009 |
| CN | 101841867 A | 9/2010 |
| CN | 101969363 A | 2/2011 |
| CN | 102301792 A | 12/2011 |
| CN | 103378957 A | 10/2013 |
| CN | 103874048 A | 6/2014 |
| CN | 104168610 A | 11/2014 |
| CN | 104205688 A | 12/2014 |
| CN | 106982468 A | 7/2017 |
| WO | 2010145520 A1 | 12/2010 |

OTHER PUBLICATIONS

"Text Proposal on Coverage Enhancement for a MTC UE," LG Electronics, 3GPP TSG RAN WG1#72, R1-130264, pp. 7, (Jan. 28-Feb. 1, 2013).

CN First Search Report dated Dec. 13, 2017 as received in Application No. 201610045838.1.

CN First Office Action dated Dec. 22, 2017 as received in Application No. 201610045838.1.

CN Second Search Report dated Jan. 14, 2018 as received in Application No. 201610045838.1.

CN Notification to Grant Patent Right for Invention dated Jan. 24, 2018 as received in Application No. 201610045838.1.

* cited by examiner

SCHEDULING METHOD AND DEVICE IN UE AND BASE STATION

CROSS-REFERENCE TO RELATED APPLICATIONS

This application is a continuation of International Application No. PCT/CN2017/071299, filed on Jan. 16, 2017, and claims benefit to Chinese Patent Application No. CN 201610045838.1, filed on Jan. 24, 2016, all of which is hereby incorporated by reference for all purposes.

BACKGROUND

Technical Field

The present disclosure is related to a transmitting scheme in a radio communication system, and more particular to a downlink scheduling method and device for supporting a narrow band transmission.

Related Art

In the #69th 3GPP (3rd Generation Partner Project) RAN (Radio Access Network) plenary, NB-IOT (NarrowBand Internet of Things) was established. The NB-IOT supports three different operation modes (RP-151621).
 1. Stand-alone operation: deployed on a spectrum used by GERAN system.
 2. Protection zone operation: deployed on a non-use resource block of the protection zone of LTE (Long Term Evolution) carrier.
 3. In-band operation: deployed on a resource block of the LTE carrier.

Further, in the NB-IOT, a UE (User Equipment) supports a radio frequency bandwidth of 180 kHz (kiloHertz) in uplink and downlink, i.e. one PRB (Physical Resource Block).

In the #83 3GPP RAN plenary, the NB-IOT system introduces the concepts of single-tone transmission and multi-tone transmission in the uplink. The single-tone means that when the UE is sent in the uplink, it may only be transmitted on one sub carrier. The multi-tone transmission continues using a transmission manner of uplink SC-FDMA (Single Carrier-Frequency Division Multiple Access), i.e. it is transmitted on the PRB (Physical Resource Block) consisted of a plurality of sub carriers. One advantage of the single-tone is that the implementation of UE uplink radio frequency is simple, it does not have a problem of PAPR (Peak to Average Power Ratio), the implementation cost is low, and the lower power consumption may be maintained, so as to improve the using time of the terminal battery.

For the traditional LTE system, a downlink HARQ-ACK is transmitted on PHICH (Physical UplinkHybrid ARQ Indicator Channel) or PDCCH (Physical downlink Control Channel). For NB-IOT, an intuitive idea is to decrease the types of the physical layer channel as much as possible, so as to reduce the complexity of the UE. Therefore, a possible scheme is that the HARQ-ACK is transmitted on the physical layer data channel, i.e. physical channel would not be particularly dedicated for the HARQ-ACK. Based on the above scheme, a problem needed to be solved is that how to achieve the co-existence of the data transmitted on the physical layer data channel and the HARQ-ACK, i.e. avoiding the collision of both.

SUMMARY

The inventor researches and discovers that if a downlink HARQ-ACK and a downlink data are transmitted on the same physical layer channel, it is a problem require to be solved that how to configure a time frequency resource occupied by the downlink HARQ-ACK and a time frequency resource occupied by the downlink data to a UE. An intuitive scheme is that the base station transmits two independent downlink signaling to indicate the time frequency resource occupied by the downlink HARQ-ACK and the time frequency resource occupied by the downlink data respectively. The above intuitive scheme may result in excessive signaling redundancy or waste of resources. For example, the downlink HARQ-ACK may only exists in a part of PRBs occupied by the downlink data, i.e. the time frequency resource occupied by the downlink data in each PRB is variable. Therefore, the scheduling signaling for the uplink data may need to allocate resource for each PRB.

The present disclosure provides a solution for the above problem. It should be noted that in the absence of conflict, the embodiments and the features of the embodiments of the UE (User Equipment) of the present disclosure may be applied to a base station and vice versa. Further, in the absence of conflict, the embodiments and the features of the embodiments of the present disclosure may be combined with each other arbitrarily.

The present disclosure discloses a method for supporting a narrow band communication in a UE, which includes the following steps:
 receiving a first signaling; and
 receiving a wireless signal on a target time frequency resource.
 Wherein the first signaling indicates a first time frequency resource, and the first time frequency resource includes a second time frequency resource. The target time frequency resource includes a time frequency resource of the first time frequency resource except the second time frequency resource. The target time frequency resource and the second time frequency resource are orthogonal. The first time frequency resource includes T1 sub frames in a time domain and includes P1 sub carriers in a frequency domain. The second time frequency resource includes T2 sub frames out of the T1 sub frames in a time domain. The T1 and the P1 are a positive integer respectively, and the T2 is smaller than the T1.

In one embodiment, the essence of the above method is that the UE transmits the wireless signal on a part of time frequency resource of the first time frequency resource indicated by the first signaling. In the above method, the first signaling does not need to explicitly indicate the target time frequency resource, so as to save the signaling overhead.

In one embodiment, a transmission channel corresponding to the wireless signal is DL-SCH (Downlink Shared Channel).

In the above method, the UE avoids occupying the second time frequency resource by default to transmit the wireless signal, i.e. does not need the configuration of the first signaling, such that the overhead of the first signaling is further saved. However, when the second time frequency resource is idle, the above method can not flexibly use the second time frequency resource. In an alternative scheme, the following method solve this problem.

The present disclosure discloses a method for supporting a narrow band communication in a UE, which includes the following steps:
 receiving a first signaling; and
 transmitting a wireless signal on a target time frequency resource.
 Wherein the first signaling indicates a first time frequency resource, and the first time frequency resource includes a second time frequency resource. The target time frequency resource includes a time frequency resource of the first time frequency resource except the second time frequency resource. The first signaling indicates whether the target time frequency resource includes the second time frequency resource. The first time frequency resource includes T1 sub frames in a time domain, and includes P1 sub carriers in a frequency domain. The second time frequency resource includes T2 sub frames out of the T1 sub frames in a time domain. The T1 and the P1 are a positive integer respectively, and the T2 is smaller than the T1.

In one embodiment, in the above method, the first signaling indicates whether the target time frequency resource includes the second time frequency resource, and determines whether the wireless signal may occupy the second time frequency resource according to the using state of the second time frequency resource. Compared to not fully occupying the second time frequency resource, the above method improves the resource utilization efficiency, and the cost thereof is a slight increase in the overhead brought by the first signaling.

In one embodiment, whether the target time frequency resource includes the second time frequency resource is indicated by one bit of the first signaling.

In one embodiment, the first signaling is a physical layer signaling.

In one embodiment, the first signaling is a physical layer signaling, and the first signaling includes the scheduling information of the wireless signal.

In one embodiment, the frequency band occupied by the wireless signal at any time does not exceed 180 kHz.

In one embodiment, the first signaling is used to DCI (Downlink Control Information) of a downlink grant.

In one embodiment, a position of the second time frequency resource in the first time frequency resource is fixed.

Specifically, according to an aspect of the present disclosure, the first signaling is a DCI used for downlink grant, and a transmission channel corresponding to the wireless signal is DL-SCH.

Specifically, according to an aspect of the present disclosure, the above method further includes the following step:
  receiving a second signaling.
  Wherein the second signaling indicates a third time frequency resource, the second time frequency resource is a part of the third time frequency resource, and the second signaling is a higher layer signaling.

In the above aspect, a base station may dynamically or semi-statically reserve a time frequency resource for HARQ-ACK. Compared to the scheme of the fixed (non-configured) second time frequency resource, such as the PHICH scheme of the existing system, the above method is more flexible.

In one embodiment, the third time frequency resource is a time frequency resource reserved for the downlink HARQ-ACK corresponding to UL-SCH (Uplink Shared Channel).

In one embodiment, the second signaling is a higher layer signaling, and the third time frequency resource is periodic in a time domain.

In a sub embodiment of the embodiment, the third time frequency resource is distributed in a positive integer number of time windows in the time domain. Wherein the time window occupies M successive millisecond (ms) in the time domain, and the positive integer number of time window are distributed periodically in the time domain.

In one embodiment, the second signaling is a higher layer signaling.

In one embodiment, the second signaling is a cell common signaling.

In one embodiment, the second signaling is RRC (Radio Resource Control) common signaling.

In one embodiment, the second signaling is RRC dedicated signaling.

In one embodiment, the second signaling is a physical layer signaling.

Specifically, according to an aspect of the present disclosure, the above method further includes the following step:
  determining the second time frequency resource.

In one embodiment, determining the second time frequency resource means that the UE determines the position of time domain and frequency domain resource occupied by the second time frequency resource by default.

In a sub embodiment of the embodiment, if the UE finishes transmitting the uplink signal at m-th ms, in the downlink sub frame corresponding to (m+m1)-th ms, the UE determines the position of the time domain and frequency domain resource occupied by the second time frequency resource in the first time frequency resource. Wherein m and m1 are a positive integer respectively, and m1 is greater than 4 and is pre-defined.

In an accompanying embodiment of the sub embodiment, the position of the second time frequency resource in the first time frequency resource is fixed.

In one embodiment, in the above aspect, the position of the second time frequency resource in the first time frequency resource is fixed, the UE obtains a transmitting initial sub frame of the downlink feedback corresponding to the uplink data transmission through a time sequence relationship of the fixed DL HARQ-ACK. The advantage of the method is that for a user waiting for the HARQ-ACK feedback after transmitting the uplink data, it does not need the additional signaling to indicate the time frequency resource position located by the waited HARQ-ACK.

Specifically, according to an aspect of the present disclosure, the above method further includes the following steps:
  transmitting an uplink signal; and
  receiving a first HARQ-ACK, and the first HARQ-ACK indicates whether the uplink signal is correctly decoded.
  Wherein the first HARQ-ACK is transmitted in the second time frequency resource, or the first HARQ-ACK is transmitted in the third time frequency resource.

In one embodiment, a transmission channel used to carry the uplink signal is UL-SCH.

In one embodiment, a bandwidth occupied by the uplink signal at any time does not exceed 180 kHz.

In one embodiment, a bandwidth occupied by the first HARQ-ACK at any time does not exceed 180 kHz.

In one embodiment, an operation ending time of the transmitting the uplink signal is n-th ms, an operation initial time of the receiving the first HARQ-ACK is not earlier than (n1+k)-th ms. Wherein k is a positive integer greater than or equal to 4, and k is pre-defined or configured by a system higher layer signaling.

In a sub embodiment of the embodiment, if the operation ending time of the transmitting the uplink signal is n1-th ms, the operation initial time of the receiving the first HARQ-ACK is (n1+k1)-th ms. Wherein k1 is a positive integer greater than or equal to 4, and k is pre-defined or configured by a system higher layer signaling.

In a sub embodiment of the embodiment, if the operation ending time of the transmitting the uplink signal is n1-th ms, the operation initial time of the receiving the first HARQ-ACK is (n1+k1)-th ms. Wherein k1 is a positive integer greater than or equal to 4, a LTE sub frame corresponding to (n1+k1)-th ms includes a part of time frequency resource of the third time frequency resource, and the part of time frequency resource is used to the transmission of the first HARQ-ACK.

Specifically, according to an aspect of the present disclosure, the first signaling is a physical layer signaling, and the first signaling includes the scheduling information of the wireless signal. The first signaling indicates that the target time frequency resource does not include the second time frequency resource and the wireless signal adopts a rate matching scheme to avoid occupying the second time frequency resource.

In one embodiment, in the above aspect, since the first signaling indicates whether the target time frequency resource includes the second time frequency resource, the UE may adopt the rate matching manner to perform a resource matching on the wireless signal, so as to avoid using a puncturing manner to perform the resource matching. Compared to the puncturing, the rate matching corresponds to better receiving performance.

In one embodiment, the rate matching scheme adopted by the wireless signal to avoid occupying the second time frequency resource is that: the modulating symbols included in the wireless signal uses the manner {frequency domain firstly, time domain secondarily} to match to RU (Resource Unit) included in the target time frequency resource in sequence. The RU includes one OFDM (Orthogonal Frequency Division Multiplexing) symbol in a time domain, and includes one sub carrier in a frequency domain. The target time frequency resource is a part of the first time frequency resource except the second time frequency resource.

In one embodiment, the rate matching scheme adopted by the wireless signal to avoid occupying the second time frequency resource is that: the modulating symbols included in the wireless signal uses the manner {time domain firstly, frequency domain secondarily} to match to RU included in the target time frequency resource in sequence. The target time frequency resource is a part of the first time frequency resource except the second time frequency resource.

In one embodiment, a bandwidth of the sub carrier of the present disclosure is 15 kHz.

In one embodiment, a bandwidth of the sub carrier of the present disclosure is 3.75 kHz.

In one embodiment, the scheduling information includes at least one of {MCS (Modulation Coding Status), NDI (New Data Indicator), TBS (Transport Block Size)}.

Specifically, according to an aspect of the present disclosure, the method further includes the following step:
receiving a third signaling.
Wherein the second signaling is a higher layer signaling, and the third signaling includes the scheduling information of the uplink signal.

In one embodiment of the above aspect, the first HARQ-ACK is transmitted in the second time frequency resource and the third signaling indicates the time frequency resource occupied by the first HARQ-ACK from the second time frequency resource.

In a sub embodiment of the above embodiment, the bandwidths occupied by the second time frequency resource and the first time frequency resource in a frequency domain are equal.

In one embodiment of the above aspect, the first HARQ-ACK is transmitted in the third time frequency resource and the third signaling indicates the time frequency resource occupied by the first HARQ-ACK from the third time frequency resource.

In a sub embodiment of the above embodiment, the bandwidth occupied by the second time frequency resource and the first time frequency resource in a frequency domain are different.

In one embodiment of the above aspect, the scheduling information of the uplink signal refers to DCI of the UL grant for scheduling the uplink signal.

Specifically, according to an aspect of the present disclosure, the third time frequency resource comprises a sub resource periodically appeared in the time domain, and the second time frequency resource is a sub resource appeared once therein; or the UE determines that the second time frequency resource is at a time domain position of the third time frequency resource according to the given information, wherein the given information is at least one of the following:
a current operation mode;
a duplex mode;
a transmission mode of the uplink signal; and
a sub carrier gap of the uplink signal;
wherein the current operation mode means that the current adopted operation mode is one of {stand-alone operation, protection zone operation, in-band operation}; the duplex mode means that the current adopted duplex mode is one of {FDD (Frequency Division Duplexing), TDD (Time Division Duplexing)}; the transmission mode of the uplink signal means that the transmission of the uplink signal is {single tone, multi tone}; the sub carrier gap of the uplink signal means that the sub carrier gap adopted by the uplink signal transmission is one of {3.75 kHz, 15 kHz}.

In one embodiment, the stand-alone operation means that the narrow band communication deploys on a spectrum used by GERAN system.

In one embodiment, the protection zone operation means that narrow band communication deploys on a non-use resource block of the protection zone of LTE (Long Term Evolution) carrier.

In one embodiment, the in-band operation means that narrow band communication deploys on a resource block of the LTE carrier.

In one embodiment, the second signaling configures the stand-alone third time frequency resource for different operation modes, the UE selects the corresponding third time frequency resource according to the operation mode, so as to determine the position of the second time frequency resource.

In one embodiment, the second signaling configures the stand-alone third time frequency resource for different duplex modes, the UE selects the corresponding third time frequency resource according to the duplex mode, so as to determine the position of the second time frequency resource.

In one embodiment, the second signaling configures the stand-alone third time frequency resource for different transmission manners of uplink signal, the UE selects the corresponding third time frequency resource according to the transmission manner of the uplink signal, so as to determine the position of the second time frequency resource.

In one embodiment, the third time frequency resource indicated by the second signaling is used to the multi tone transmission, the first HARQ-ACK for the single tone transmission is transmitted in a fourth time frequency resource, and the fourth time frequency resource is a sub set of the third time frequency resource.

In a sub embodiment of the embodiment, the third time frequency resource is distributed in a positive integer number of time windows in the time domain, and the positive integer number of time windows are distributed periodically in the time domain, wherein the period is Q1. The fourth time frequency resource is distributed in a positive integer number of time windows in the time domain, and the positive integer number of time windows are distributed periodically in the time domain, wherein the period is Q2. Wherein Q2 is a positive integer times of Q1.

In one embodiment, the sub carrier gap of the third time frequency resource indicated by the second signaling used for the uplink is a scenario of 15 kHz, for the sub carrier gap of the uplink signal is a scenario of 3.75 kHz, the first HARQ-ACK is transmitted in the fourth time frequency resource, and the fourth time frequency resource is a sub set of the third time frequency resource.

In a sub embodiment of the embodiment, the third time frequency resource is distributed in a positive integer number of time windows in the time domain, and the positive integer number of time windows are distributed periodically in the time domain, wherein the period is Q1. The fourth time frequency resource is distributed in a positive integer number of time windows in the time domain, and the positive integer number of time windows are distributed periodically in the time domain, wherein the period is Q2. Wherein Q2 is a positive integer times of Q1.

The present disclosure discloses a method for supporting a narrow band communication in a base station which includes the following steps:
  transmitting a first signaling; and
  transmitting a wireless signal on a target time frequency resource.

Wherein the first signaling indicates a first time frequency resource, and the first time frequency resource includes a second time frequency resource. The target time frequency resource includes a time frequency resource of the first time frequency resource except the second time frequency resource. The target time frequency resource and the second time frequency resource are orthogonal, or the first signaling indicates whether the target time frequency resource includes the second time frequency resource. The first time frequency resource includes T1 sub frames in a time domain, and includes P1 sub carriers in a frequency domain. The second time frequency resource includes T2 sub frames out of the T1 sub frames in a time domain. The T1 and the P1 are a positive integer respectively, and the T2 is smaller than the T1.

In one embodiment, the position of the second time frequency resource in the first time frequency resource is fixed, i.e. it does not need to be configured by the downlink signaling.

Specifically, according to an aspect of the present disclosure, the first signaling is a DCI used for downlink grant, and a transmission channel corresponding to the wireless signal is DL-SCH.

Specifically, according to an aspect of the present disclosure, the above method further includes the following step:
  transmitting a second signaling.

Wherein the second signaling indicates the third time frequency resource, the second time frequency resource is a part of the third time frequency resource, and the second signaling is a higher layer signaling.

In one embodiment, the third time frequency resource includes a sub resource periodically appeared in a time domain, and the second time frequency resource is a sub resource appeared once therein.

Specifically, according to an aspect of the present disclosure, the above method further includes the following step A1:
  selecting the second time frequency resource.

In one embodiment, the selecting the second time frequency resource means that the base station selects the position of the time domain and frequency domain resource occupied by the second time frequency resource by default.

In a sub embodiment of the embodiment, if the base station finishes receiving the uplink signal at m-th ms, in the downlink sub frame corresponding to (m+m1)-th ms, the base station selects the position of the time domain and frequency domain resource occupied by the second time frequency resource in the first time frequency resource. Wherein m and m1 are a positive integer respectively, and m1 is greater than 4 and is pre-defined.

Specifically, according to an aspect of the present disclosure, the above method further includes the following steps:
  receiving an uplink signal; and
  transmitting a first HARQ-ACK, and the first HARQ-ACK indicates whether the uplink signal is correctly decoded.

Wherein the first HARQ-ACK is transmitted in the second time frequency resource, or the first HARQ-ACK is transmitted in the third time frequency resource.

Specifically, according to an aspect of the present disclosure, the first signaling is a physical layer signaling, and the first signaling includes the scheduling information of the wireless signal. The first signaling indicates that the target time frequency resource does not include the second time frequency resource and the wireless signal adopts a rate matching scheme to avoid occupying the second time frequency resource.

Specifically, according to an aspect of the present disclosure, the above method further includes the following step:
  transmitting a third signaling.

Wherein the second signaling is a higher layer signaling, and the third signaling includes the scheduling information of the uplink signal. The first HARQ-ACK is transmitted in the second time frequency resource and the third signaling indicates the time frequency resource occupied by the first HARQ-ACK from the second time frequency resource, or the first HARQ-ACK is transmitted in the third second time frequency resource and the third signaling indicates the time frequency resource occupied by the first HARQ-ACK from the third time frequency resource.

Specifically, according to an aspect of the present disclosure, the third time frequency resource comprises a sub resource periodically appeared in the time domain, and the second time frequency resource is a sub resource appeared once therein; or the base station selects that the second time frequency resource is at a time domain position of the third time frequency resource according to the given information, wherein the given information is at least one of the following:
  a current operation mode;
  a duplex mode;
  a transmission mode of the uplink signal; and
  a sub carrier gap of the uplink signal;
  wherein the current operation mode means that the current adopted operation mode is one of {stand-alone operation, protection zone operation, in-band operation}; the duplex mode means that the current adopted duplex mode is one of {FDD, TDD}; the transmission mode of the uplink signal means that the transmission of the uplink signal is {single tone, multi tone}; the sub carrier gap of the uplink signal means that the sub carrier gap adopted by the uplink signal transmission is one of {3.75 kHz, 15 kHz}.

The present disclosure discloses a user equipment for supporting a narrow band communication, includes the following modules:
  a first module, for transmitting an uplink signal;
  a second module, for receiving a first signaling; and
  a third module, for receiving a wireless signal on a target time frequency resource.

Wherein the first signaling indicates a first time frequency resource, and the first time frequency resource includes a second time frequency resource. The target time frequency resource includes a time frequency resource of the first time frequency resource except the second time frequency resource. The target time frequency resource and the second time frequency resource are orthogonal, or the first signaling indicates whether the target time frequency resource includes the second time frequency resource. The first time frequency resource includes T1 sub frames in a time domain, and includes P1 sub carriers in a frequency domain. The second time frequency resource includes T2 sub frames out of the T1 sub frames in a time domain. The T1 and the P1 are a positive integer respectively, and the T2 is smaller than the T1.

In one embodiment of the above user equipment, the first signaling is a DCI used for downlink grant, and a transmission channel corresponding to the wireless signal is DL-SCH.

In one embodiment of the above user equipment, the second module is further used for receiving a second signaling. Wherein the second signaling indicates a third time frequency resource, t the second time frequency resource is a part of the third time frequency resource, and the second signaling is a higher layer signaling.

In one embodiment of the above user equipment, the third time frequency resource comprises a sub resource periodically appeared in the time domain, and the second time frequency resource is a sub resource appeared once therein.

In one embodiment of the above user equipment, the second module is further used for determining the second time frequency resource.

In one embodiment of the above user equipment,
  the third module is further used for receiving a first HARQ-ACK, and the first HARQ-ACK indicates whether the uplink signal is correctly decoded.
  Wherein the first HARQ-ACK is transmitted in the second time frequency resource, or the first HARQ-ACK is transmitted in the third time frequency resource.

In one embodiment of the above user equipment, the first signaling is a physical layer signaling, the first signaling includes the scheduling information of the wireless signal. The first signaling indicates that the target time frequency resource does not include the second time frequency resource and the wireless signal adopts a rate matching scheme to avoid occupying the second time frequency resource, or the first signaling indicates that the target time frequency resource includes the second time frequency resource.

In one embodiment of the above user equipment, a third module is used for receiving a third signaling. Wherein the second signaling is a higher layer signaling, and the third signaling includes the scheduling information of the uplink signal. The first HARQ-ACK is transmitted in the second time frequency resource and the third signaling indicates the time frequency resource occupied by the first HARQ-ACK from the second time frequency resource, or the first HARQ-ACK is transmitted in the third time frequency resource and the third signaling indicates the time frequency resource occupied by the first HARQ-ACK from the third time frequency resource.

The present disclosure discloses a base station equipment for supporting a narrow band communication, which includes the following modules:
  a first module, for receiving an uplink signal;
  a second module, for transmitting a first signaling; and
  a third module, for transmitting a wireless signal on a target time frequency resource.

Wherein the first signaling indicates a first time frequency resource, and the first time frequency resource includes a second time frequency resource. The target time frequency resource includes a time frequency resource of the first time frequency resource except the second time frequency resource. The target time frequency resource and the second time frequency resource are orthogonal, or the first signaling indicates whether the target time frequency resource includes the second time frequency resource. The first time frequency resource includes T1 sub frames in a time domain, and includes P1 sub carriers in a frequency domain. The second time frequency resource includes T2 sub frames out of the T1 sub frames in a time domain. The T1 and the P1 are a positive integer respectively, and the T2 is smaller than the T1.

In one embodiment of the base station, the first signaling is a DCI used for downlink grant, and a transmission channel corresponding to the wireless signal is DL-SCH.

In one embodiment of the base station, the second module is further used for transmitting a second signaling. Wherein the second signaling indicates a third time frequency resource, the second time frequency resource is a part of the third time frequency resource, and the second signaling is a higher layer signaling.

In one embodiment of the base station equipment, the third time frequency resource comprises a sub resource periodically appeared in the time domain, and the second time frequency resource is a sub resource appeared once therein.

In one embodiment of the base station equipment, the second module is further used for selecting the second time frequency resource.

In one embodiment of the base station equipment,
  the third module is used for transmitting a first HARQ-ACK, and the first HARQ-ACK indicates whether the uplink signal is correctly decoded.
  Wherein the first HARQ-ACK is transmitted in the second time frequency resource, or the first HARQ-ACK is transmitted in the third time frequency resource.

In one embodiment of the base station equipment, the first signaling is a physical layer signaling, and the first signaling includes the scheduling information of the wireless signal. The first signaling indicates that the target time frequency resource does not include the second time frequency resource and the wireless signal adopts a rate matching scheme to avoid occupying the second time frequency resource, or the first signaling indicates that the target time frequency resource includes the second time frequency resource.

In one embodiment of the base station equipment, a third module is further used for transmitting a third signaling. Wherein the second signaling is a higher layer signaling, and the third signaling includes the scheduling information of the uplink signal. The first HARQ-ACK is transmitted in the second time frequency resource and the third signaling indicates the time frequency resource occupied by the first HARQ-ACK from the second time frequency, or the first HARQ-ACK is transmitted in the third time frequency resource and the third signaling indicates the time frequency resource occupied by the first HARQ-ACK from the third time frequency resource.

Compared to the existing disclosed technique, the present disclosure has the following advantages.

A problem that the channel may not be released because the downlink sub frame is continuously occupied is avoided.

The collision of the HARQ-ACK and the downlink data is avoided, and the resource of the physical layer data channel is fully used as much as possible at the same time.

BRIEF DESCRIPTION OF THE DRAWINGS

The above and other exemplary aspects, features and advantages of certain exemplary embodiments of the present disclosure will be more apparent from the following description taken in conjunction with the accompanying drawings, in which.

DETAILED DESCRIPTION

The following description with reference to the accompanying drawings is provided to explain the exemplary embodiments of the disclosure. Note that in the case of no conflict, the embodiments of the present disclosure and the features of the embodiments may be arbitrarily combined with each other.

Embodiment I

Figure 1:
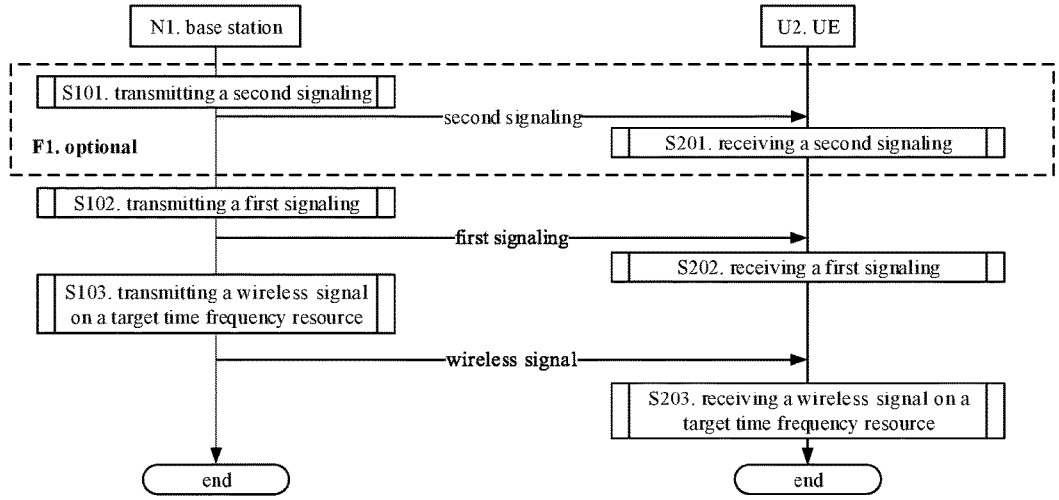
FIG. 1 is a flowchart of a downlink transmission of a wireless signal according to one embodiment of the present disclosure.

Embodiment I illustrates a flowchart of a downlink transmission of a wireless signal, as shown in FIG. 1. In FIG. 1, a base station N1 is a maintenance base station of a serving cell of UE U2, and the step identified by a square frame F1 is optional.

For the base station N1, in step S101, the method involves transmitting a second signaling. In step S102, the method involves transmitting a first signaling, and in step S103, the method involves transmitting a wireless signal on a target time frequency resource.

For the UE U2, in step S201, the method involves receiving a second signaling. In step S202, the method involves receiving a first signaling, and in step S203, the method involves receiving a wireless signal on a target time frequency resource.

In Embodiment I, the second signaling indicates a third time frequency resource, and the second time frequency resource is a part where the third time frequency resource and the first time frequency resource overlap each other. The first signaling indicates a first time frequency resource, and the first time frequency resource includes a second time frequency resource. The target time frequency resource includes a time frequency resource of the first time frequency resource except the second time frequency resource. The target time frequency resource and the second time frequency resource are orthogonal (i.e. not include the second time frequency resource), or the first signaling indicates whether the target time frequency resource includes the second time frequency resource (the first signaling indicates that the target time frequency resource includes the second time frequency resource, i.e. the target time frequency resource is the first time frequency resource). The second signaling is a higher layer signaling.

In a first exemplary embodiment of Embodiment I, the first signaling is a physical layer signaling, and the second signaling is RRC common signaling. The carrying channel corresponding to the wireless signal is DL-SCH.

In a second exemplary embodiment of Embodiment I, the first time frequency resource includes T1 continuous sub frames in a time domain, and includes P1 sub carriers in a frequency domain of each sub frame, the T1 and the P1 are a positive, the second time frequency resource includes T2 sub frames out of the T1 sub frames in a time domain, and the T2 is smaller than the T1.

In a third exemplary embodiment of Embodiment I, the first signaling includes the scheduling information of the wireless signal. The first signaling indicates that the target time frequency resource does not includes the second time frequency resource and the wireless signal adopts a rate matching scheme to avoid occupying the second time frequency resource, or the first signaling indicates that the target time frequency resource includes the second time frequency resource and the target time frequency resource includes the second time frequency resource.

Embodiment II

Figure 2:
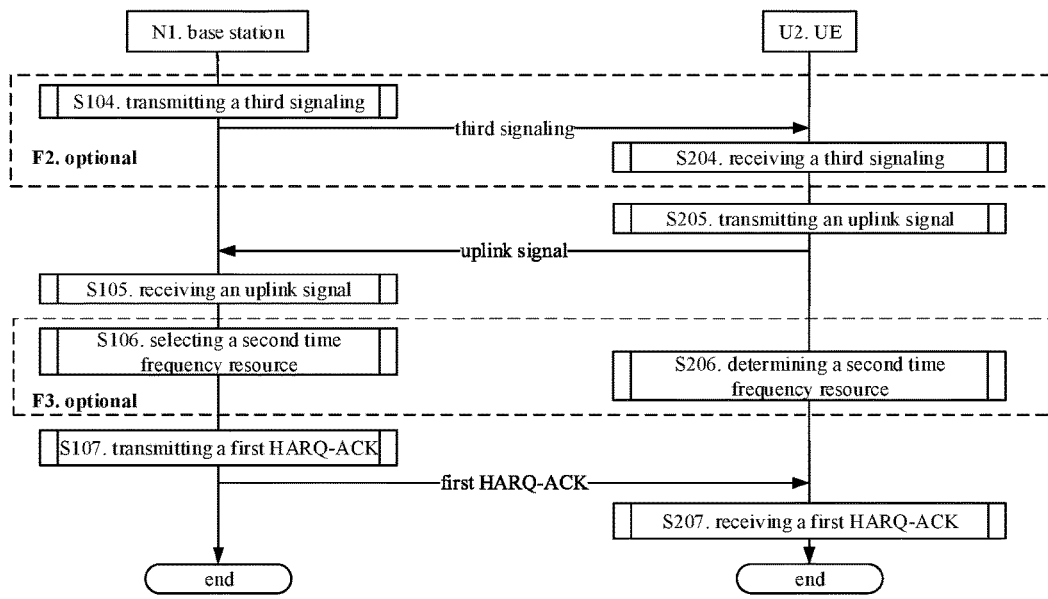
FIG. 2 is a flowchart of a downlink HARQ-ACK transmission according to one embodiment of the present disclosure.

Embodiment II illustrates a flowchart of a downlink HARQ-ACK transmission, as shown in FIG. 2. In FIG. 2, a base station N1 is a maintenance base station of a serving cell of UE U2, and the step identified by square frames F2 and F3 is optional.

For the base station N1, in step S104, the method involves transmitting a third signaling, in step S105, the method involves receiving an uplink signal, in step S106, the method involves selecting a second time frequency resource, and in step S107, the method involves transmitting a first HARQ-ACK.

For the UE U2, in step S204, the method involves receiving a third signaling, in step S205, the method involves transmitting an uplink signal, in step S206, the method involves determining a second time frequency resource, and in step S207, the method involves receiving a first HARQ-ACK.

In Embodiment II, the first HARQ-ACK indicates whether the uplink signal is correctly decoded, and the first HARQ-ACK is transmitted in a third time frequency resource. In the present disclosure, the second signaling is a higher layer signaling, and the third signaling includes the scheduling information of the uplink signal. The first HARQ-ACK is transmitted in the third time frequency resource and the third signaling indicates the time frequency resource occupied by the first HARQ-ACK from the third signaling.

In a first exemplary embodiment of Embodiment II, the time domain resource occupied by the first HARQ-ACK and the wireless signal of the present disclosure are orthogonal (i.e. non-overlapping).

In a second exemplary embodiment of Embodiment II, the third signaling is a physical layer signaling.

In a third exemplary embodiment of Embodiment II, the downlink signal includes one transmission block.

Embodiment III

Figure 3:
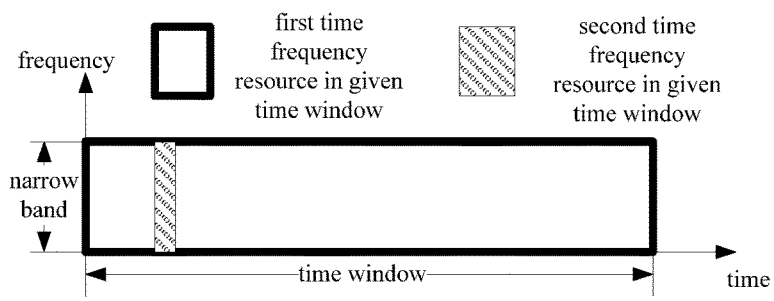
FIG. 3 is a diagram illustrating a first time frequency resource and a second time frequency resource in a given time window according to one embodiment of the present disclosure.

Embodiment III illustrates a diagram of a first time frequency resource and a second time frequency resource in a given time window, as shown in FIG. 3. In FIG. 3, a thick line frame identifies a time frequency resource occupied by the first time frequency resource in one time window, and a backslash identifies a time frequency resource occupied by the second time frequency resource in one time window.

In Embodiment III, the first time frequency resource occupies an entire narrow band in the given time window and occupies an entire time window in a time domain. The second time frequency resource occupies the entire narrow band in the given time window and occupies a part of OFDM symbols of the given time window in a time domain.

In a first exemplary embodiment of Embodiment III, a bandwidth of the narrow band does not exceed 180 kHz.

In a second exemplary embodiment of Embodiment III, a duration of the time window is T ms, and the T is a positive integer.

In a third exemplary embodiment of Embodiment III, the first time frequency resource only occupies one time window in the time domain.

In a fourth exemplary embodiment of Embodiment III, the first time frequency resource occupies a plurality of time windows in the time domain.

In a fifth exemplary embodiment of Embodiment III, the time windows includes a positive integer number of successive sub frames.

In a sixth exemplary embodiment of Embodiment III, the time window is one LTE downlink sub frame.

Embodiment IV

Figure 4:
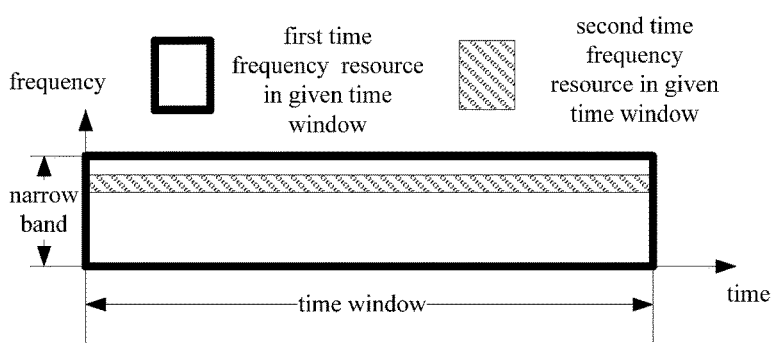
FIG. 4 is a diagram illustrating a first time frequency resource and a second time frequency resource in a given time window according to another embodiment of the present disclosure.

Embodiment IV illustrates a diagram of a first time frequency resource and a second time frequency resource in a given time window, as shown in FIG. 4. In FIG. 4, a thick line frame identifies a time frequency resource occupied by the first time frequency resource in one time window, and a backslash identifies a time frequency resource occupied by the second time frequency resource in one time window.

In Embodiment IV, the first time frequency resource occupies an entire narrow band in the given time window and occupies an entire time window in a time domain. The second time frequency resource occupies a part of sub carriers of the entire narrow band in a given time window, and occupies entire given time window in the time domain.

Embodiment V

Figure 5:
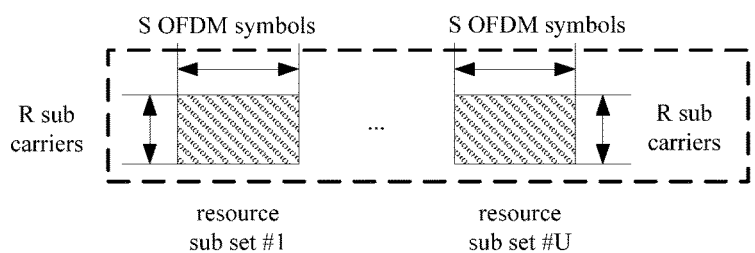
FIG. 5 is a diagram illustrating a first time frequency resource in a given time window according to another embodiment of the present disclosure.

Embodiment V illustrates a diagram of a first time frequency resource in a given time window, as shown in FIG. 5. In FIG. 5, a thick line frame identifies a time frequency resource occupied by the first time frequency resource in one time window, and a backslash identifies a time frequency resource occupied by the first time frequency resource in one time window.

In Embodiment V, in one time window occupied by the first time frequency resource, a second time frequency resource is consist of U resource sub sets. Each of the resource sub sets occupies S OFDM symbols in a time domain, and occupies R successive sub carriers in a frequency domain. All of the time frequency resources occupied by the U resource sub sets belong to the first time frequency resource.

Embodiment VI

Figure 6:
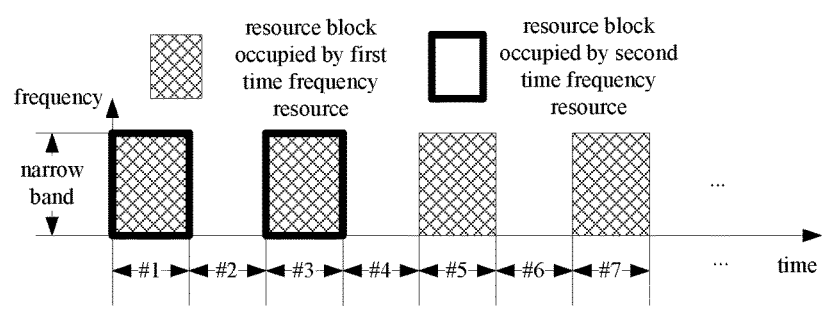
FIG. 6 is a diagram illustrating resource blocks occupied by a first time frequency resource and a second time frequency resource according to one embodiment of the present disclosure.

Embodiment VI illustrates a diagram of resources blocks occupied by a first time frequency resource and a second time frequency resource, as shown in FIG. 6. In FIG. 6, a thick line frame identifies a resource block occupied by the second time frequency resource, and a cross line identifies a resource block occupied by the first time frequency resource. Each of bidirectional arrows {#1, #2, . . . } identifies one time window respectively.

In Embodiment VI, the resource block occupies one time window in a time domain, and occupied one narrow band in a frequency domain. The first time frequency resource is distributed in a narrow band. The resource block occupied by the second time frequency resource is a part of resource blocks occupied by the first time frequency resource.

In a first exemplary embodiment of Embodiment VI, RU pattern occupied by the first time frequency resource in each of resource blocks is identical.

In a second exemplary embodiment of Embodiment VI, the first time frequency resource only occupies a part of RUs in each of resource blocks.

In a third exemplary embodiment of Embodiment VI, the time windows includes a positive integer number of successive sub frames.

In a fourth exemplary embodiment of Embodiment VI, the time window is one LTE downlink sub frame.

Embodiment VII

Figure 7:
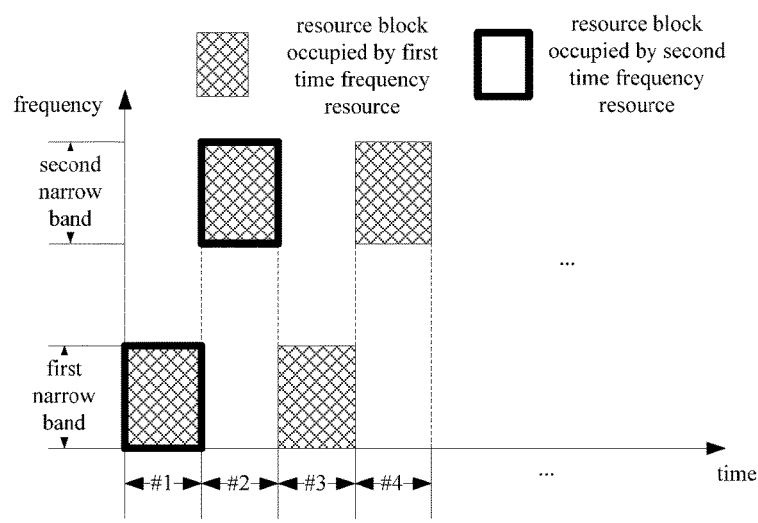
FIG. 7 is a diagram illustrating resource blocks occupied by a first time frequency resource and a second time frequency resource according to another embodiment of the present disclosure.

Embodiment VII illustrates a diagram of resources blocks occupied by a first time frequency resource and a second time frequency resource, as shown in FIG. 7. In FIG. 7, a thick line frame identifies a resource block occupied by the second time frequency resource, and a cross line identifies a resource block occupied by the first time frequency resource. Each of bidirectional arrows {#1, #2, . . . } identifies one time window respectively.

In Embodiment VII, the resource block occupies one time window in a time domain, and occupies one narrow band in a frequency domain. The first time frequency resource hops on a first narrow band and a second narrow band. The resource block occupied by the second time frequency resource is a part of resource blocks occupied by the first time frequency resource.

In a first exemplary embodiment of Embodiment VII, RU pattern occupied by the first time frequency resource in each of resource blocks is identical.

In a second exemplary embodiment of Embodiment VII, the first time frequency resource only occupies a part of RUs in each of resource blocks.

In a third exemplary embodiment of Embodiment VII, the time windows includes a positive integer number of successive sub frames.

In a fourth exemplary embodiment of Embodiment VII, the time window is one LTE downlink sub frame.

Embodiment VIII

Figure 8:
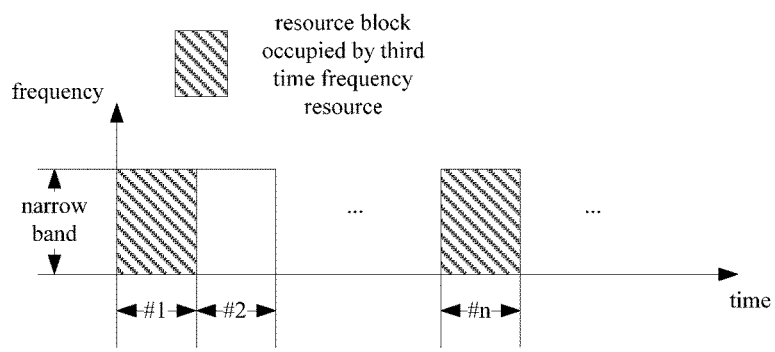
FIG. 8 is a diagram illustrating a resource block occupied by a third time frequency resource according to one embodiment of the present disclosure.

Embodiment VIII illustrates a diagram of resources blocks occupied by a third time frequency resource, as shown in FIG. 8. In FIG. 8, a backslash identifies a resource block occupied by the third time frequency resource. Each of bidirectional arrows {#1, #2, . . . } identifies one time window respectively.

In Embodiment VIII, the resource block occupied by the third time frequency resource in the time domain is non-continuous, and the resource occupies one narrow band in the frequency domain and occupies one time window in the time domain.

In a first exemplary embodiment of Embodiment VIII, the resource block occupied by the third time frequency resource is periodically appeared in a time domain, and the appeared period is n time window. The n is a positive integer greater than 1.

In a second exemplary embodiment of Embodiment VIII, the second time frequency resource only occupies one resource block of the third time frequency resource.

In a third exemplary embodiment of Embodiment VIII, the first HARQ-ACK of the present disclosure is transmitted in the third time frequency resource, and the third signaling of the present disclosure indicates the resource block occupied by the first HARQ-ACK from the resource block occupied by the third time frequency resource. In a sub embodiment, the time frequency resource occupied by the first HARQ-ACK in the block resource is default (i.e. does not need the signaling configuration).

In a fourth exemplary embodiment of Embodiment VIII, a bandwidth of the narrow band is 180 kHz.

In a fifth exemplary embodiment of Embodiment VIII, the RU occupied by the third time frequency resource in the resource block is fixed (i.e. does not need the signaling configuration).

In a sixth exemplary embodiment of Embodiment VI, the time windows includes a positive integer number of successive sub frames.

In a seventh exemplary embodiment of Embodiment VI, the time window is one LTE downlink sub frame.

Embodiment IX

Figure 9:
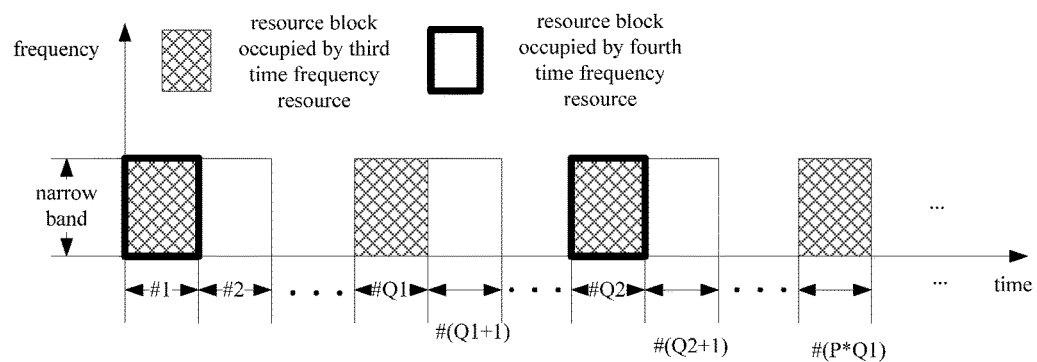
FIG. 9 is a diagram illustrating resource blocks occupied by a third time frequency resource and a fourth time frequency resource according to one embodiment of the present disclosure.

Embodiment IX illustrates a diagram of resources blocks occupied by a third time frequency resource and a fourth time frequency resource according to the present disclosure, as shown in FIG. 9. In FIG. 9, a thick line frame identifies a resource block occupied by the fourth time frequency resource, and a cross line identifies a resource block occupied by the third time frequency resource. Each of bidirectional arrows {#1, #2, . . . } identifies one time window respectively.

In Embodiment IX, the resource block occupies one time window in a time domain, and occupies one narrow band in a frequency domain. The third time frequency resource is distributed in one narrow band. The resource block occupied by the fourth time frequency resource is a part of resource blocks occupied by the third time frequency resource. Q1, Q2 and P are a positive integer respectively, and the product of P and Q1 is greater than Q2

In a first exemplary embodiment of Embodiment IX, RU pattern occupied by the third time frequency resource in each of resource blocks is identical.

In a second exemplary embodiment of Embodiment IX, the third time frequency resource only occupies a part of RUs in each of resource blocks.

In a third exemplary embodiment of Embodiment IX, the time windows includes a positive integer number of successive sub frames.

In a fourth exemplary embodiment of Embodiment IX, the time window is one LTE downlink sub frame.

In a fifth exemplary embodiment of Embodiment IX, the resource block occupied by the third time frequency resource is appeared periodically in the time domain, and the appeared period is Q1 time windows. The resource block occupied by the fourth time frequency resource is appeared periodically in the time domain, and the appeared period is Q2 time windows. Q1 and Q2 are a positive integer respectively, and Q2 is a positive integer times of Q1.

Embodiment X

Figure 10:
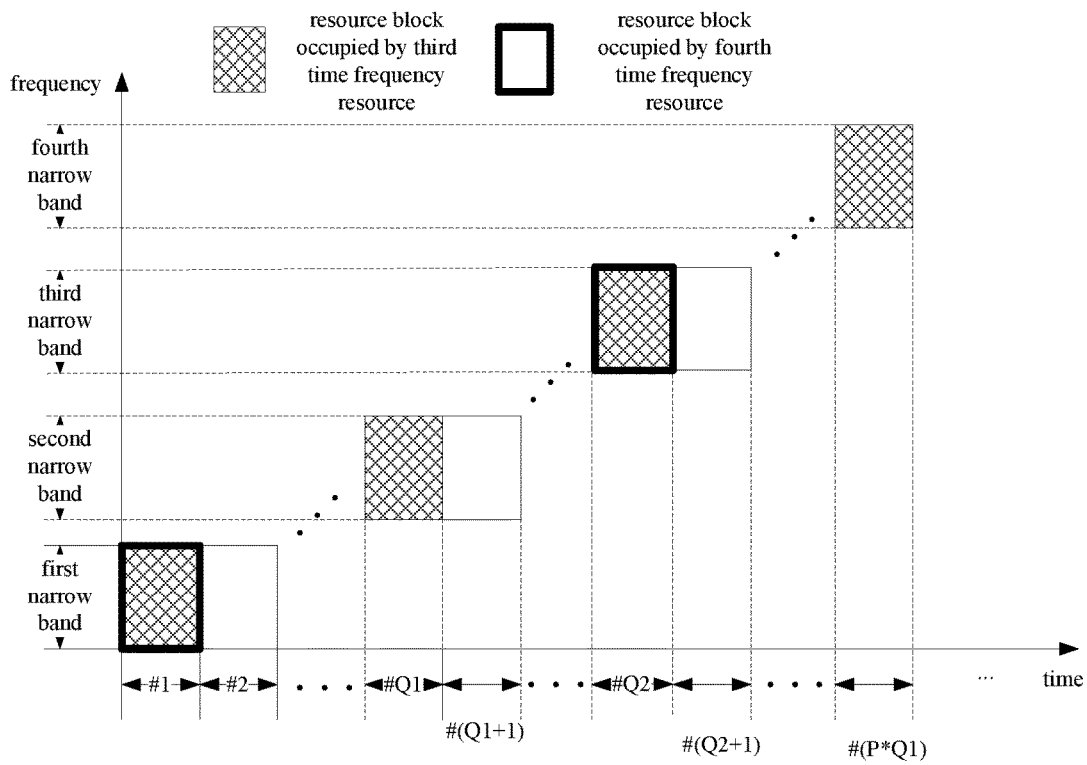
FIG. 10 is a diagram illustrating resource blocks occupied by a third time frequency resource and a fourth time frequency resource according to another embodiment of the present disclosure.

Embodiment X illustrates a diagram of resources blocks occupied by a third time frequency resource and a fourth time frequency resource according to the present disclosure, as shown in FIG. 10. In FIG. 10, a thick line frame identifies a resource block occupied by the fourth time frequency resource, and a cross line identifies a resource block occupied by the third time frequency resource. Each of bidirectional arrows {#1, #2, . . . } identifies one time window respectively.

In Embodiment X, the resource block occupies one time window in a time domain, and occupies one narrow band in a frequency domain. The third time frequency resource is distributed in multi narrow bands. The resource block occupied by the fourth time frequency resource is a part of resource blocks occupied by the third time frequency resource. Q1, Q2 and P are a positive integer respectively, and the product of P and Q1 is greater than Q2

In a first exemplary embodiment of Embodiment X, RU pattern occupied by the third time frequency resource in each of resource blocks is identical.

In a second exemplary embodiment of Embodiment X, the third time frequency resource only occupies a part of RUs in each of resource blocks.

In a third exemplary embodiment of Embodiment X, the time windows includes a positive integer number of successive sub frames.

In a fourth exemplary embodiment of Embodiment X, the time window is one LTE downlink sub frame.

In a fifth exemplary embodiment of Embodiment X, the resource block occupied by the third time frequency resource is appeared periodically in the time domain, and the appeared period is Q1 time windows. The resource block occupied by the fourth time frequency resource is appeared periodically in the time domain, and the appeared period is Q2 time windows. Q1 and Q2 are a positive integer respectively, and Q2 is a positive integer times of Q1.

Embodiment XI

Figure 11:
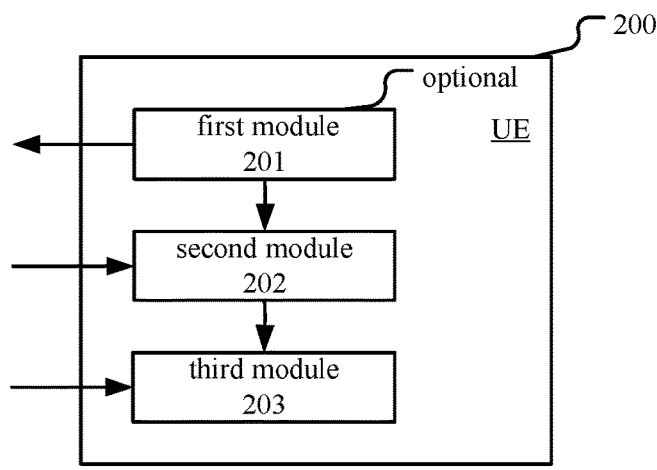
FIG. 11 is a structure diagram illustrating a processing apparatus used in a UE according to one embodiment of the present disclosure.

Embodiment XI is a structure diagram illustrating a processing apparatus used in a UE, as shown in FIG. 11. In FIG. 11, the UE processing apparatus 200 mainly includes a first module 201, a second module 202 and a third module 203.

Wherein the first module 201 is optional.

The first receiving module 201 is used for transmitting an uplink signal. The second module 202 is used for receiving a first signaling and receiving a second signaling. The third receiving module 202 is used for receiving a wireless signal on a target time frequency resource.

In Embodiment XI, the first signaling is a physical layer signaling, and the second signaling is a higher layer signaling. The first signaling indicates a first time frequency resource, and the first time frequency resource includes a second time frequency resource. The target time frequency resource includes a time frequency resource of the first time frequency resource except the second time frequency resource. The target time frequency resource and the second time frequency resource are orthogonal, or the first signaling indicates whether the target time frequency resource includes the second time frequency resource. The second signaling indicates a third time frequency resource, and the second time frequency resource is a part of the third time frequency resource.

In a first exemplary embodiment of Embodiment XI, the second module 201 is further used for determining a second time frequency resource.

In a second exemplary embodiment of Embodiment XI, the third module is used for receiving a third signaling. Wherein the second signaling is a higher layer signaling, and the third signaling includes the scheduling information of the uplink signal. A first HARQ-ACK is transmitted in the second time frequency resource and the third signaling indicates the time frequency resource occupied by the first HARQ-ACK from the second time frequency resource, or the first HARQ-ACK is transmitted in a third time frequency resource and the third signaling indicates the time frequency resource occupied by the first HARQ-ACK from the third time frequency resource.

In a third exemplary embodiment of Embodiment XI, the third module 203 is used for receiving the first HARQ-ACK. Wherein the first HARQ-ACK indicates whether the uplink signal is correctly decoded. The first HARQ-ACK is transmitted in the second time frequency resource, or the first HARQ-ACK is transmitted in the third time frequency resource.

Embodiment XII

Figure 12:
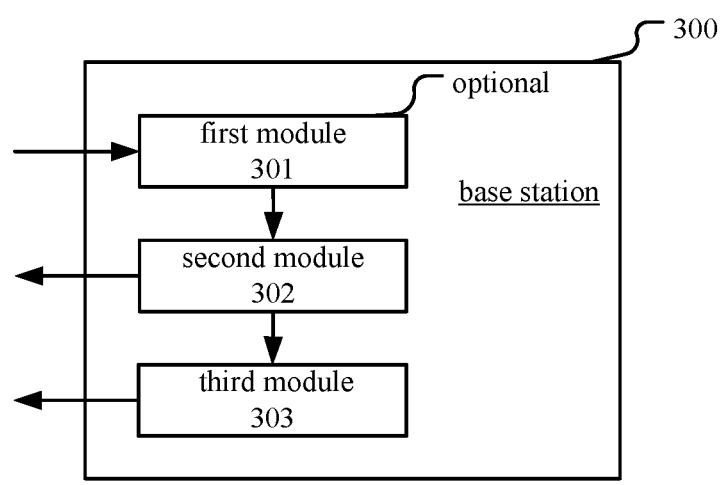
FIG. 12 is a structure diagram illustrating a processing apparatus used in a base station according to one embodiment of the present disclosure.

Embodiment XII is a structure diagram illustrating a processing apparatus used in a base station, as shown in FIG. 12. In FIG. 12, the base station processing apparatus 300 mainly includes a first module 301, a second module 302 and a third module 303. Wherein the first module 301 is optional.

The first module 301 is used for receiving an uplink signal. The second module 302 is used for transmitting a first signaling and a second signaling. The third module 303 is used for transmitting a wireless signal on a target time frequency resource.

In Embodiment XII, the first signaling is a physical layer signaling, and the second signaling is a higher layer signaling. The first signaling indicates a first time frequency resource, and the first time frequency resource includes a second time frequency resource. The target time frequency resource includes a time frequency resource of the first time frequency resource except the second time frequency resource. The target time frequency resource and the second time frequency resource are orthogonal, or the first signaling indicates whether the target time frequency resource includes the second time frequency resource. The second signaling indicates a third time frequency, and the second time frequency resource is a part of third time frequency resource.

In a first exemplary embodiment of Embodiment XII, the second module 302 is used for selecting the second time frequency resource.

In a second exemplary embodiment of Embodiment XII, the third module 303 is used for transmitting a third signaling. Wherein the second signaling is a higher layer signaling, and the third signaling includes the scheduling information of the uplink signal. A first HARQ-ACK is transmitted in the second time frequency resource and the third signaling indicates the time frequency resource occupied by the first HARQ-ACK from the second time frequency resource, or the first HARQ-ACK is transmitted in a third time frequency resource and the third signaling indicates the time frequency resource occupied by the first HARQ-ACK from the third time frequency resource.

In a third exemplary embodiment of Embodiment XII, the third module 303 is used for transmitting the first HARQ-ACK. Wherein the first HARQ-ACK indicates whether the uplink signal is correctly decoded. The first HARQ-ACK is transmitted in the second time frequency resource, or the first HARQ-ACK is transmitted in the third time frequency resource.

Those of ordinary skill will be appreciated that all or part of the above method may be accomplished by a program instructing related hardware. The program may be stored in a computer-readable storage medium, such as read-only memory, a hard disk or CD-ROM. Alternatively, all or part of the steps of the above-described embodiments may be accomplished by one or more integrated circuits. Accordingly, each module in the above-described embodiments may be accomplished by hardware implementation, or may also be realized by the form of software modules. The present disclosure is not limited to any particular form of combination of software and hardware. The UE and the terminal of the present disclosure include, but not limited to a wireless communication device, such as RFID, a IOT (Internet of Things) terminal, a MTC (Machine Type Communication) terminal, a vehicle-mounted communication device, a wireless sensor, a network card, a mobile phone, a tablet computer, a notebook, etc. The base station and the base station equipment of the present disclosure includes, but not limited to a wireless communication device, such as a macrocell base station, a microcell base station, a home base station, a relay base station, etc.

Although the present disclosure is illustrated and described with reference to specific embodiments, those skilled in the art will understand that many variations and modifications are readily attainable without departing from the spirit and scope thereof as defined by the appended claims and their legal equivalents.

What is claimed is:

1. A method for supporting a narrow band communication in a UE, comprising:
   receiving a first signaling; and
   receiving a wireless signal on a target time frequency resource;
   wherein the first signaling indicates a first time frequency resource, the first time frequency resource comprises a second time frequency resource, the target time frequency resource comprises a time frequency resource of the first time frequency resource except the second time frequency resource, the target time frequency resource and the second time frequency resource are orthogonal or the first signaling indicates whether the target time frequency resource comprises the second time frequency resource, the first time frequency resource comprises T1 sub frames in a time domain, and comprises P1 sub carriers in a frequency domain, the second time frequency resource comprises T2 sub frames out of the T1 sub frames in a time domain, the T1 and the P1 are a positive integer respectively, and the T2 is smaller than the T1; the first signaling is a physical layer signaling, and the first signaling includes scheduling information of the wireless signal.

2. The method according to claim 1, wherein the method further comprises:
   receiving a second signaling;
   wherein the second signaling indicates a third time frequency resource, the second time frequency resource is a part of the third time frequency resource, and the second signaling is a higher layer signaling.

3. The method according to claim 1, wherein the first signaling is a DCI used for downlink grant, and a transmission channel corresponding to the wireless signal is DL-SCH.

4. The method according to claim 1, wherein the method further comprises:
   transmitting an uplink signal; and
   receiving a first HARQ-ACK, and the first HARQ-ACK indicates whether the uplink signal is correctly decoded;
   wherein the first HARQ-ACK is transmitted in the second time frequency resource, or the first HARQ-ACK is transmitted in a third time frequency resource.

5. The method according to claim 1, the first signaling indicates that the target time frequency resource does not comprise the second time frequency resource and the wireless signal adopts a rate matching scheme to avoid occupying the second time frequency resource.

6. The method according to claim 2, wherein the third time frequency resource comprises a sub resource periodically appeared in the time domain, and the second time frequency resource is a sub resource appeared once therein; or the UE determines that the second time frequency resource is at a time domain position of the third time frequency resource according to the given information, wherein the given information is at least one of the following:
   a current operation mode;
   a duplex mode;
   a transmission mode of an uplink signal; and
   a sub carrier gap of the uplink signal;
   wherein the current operation mode means that the current adopted operation mode is one of {stand-alone operation, protection zone operation, in-band operation}; the duplex mode means that the current adopted duplex mode is one of {FDD, TDD}; the transmission mode of the uplink signal means that the transmission of the uplink signal is {single tone, multi tone}; the sub carrier gap of the uplink signal means that the sub carrier gap adopted by the uplink signal transmission is one of {3.75 kHz, 15 kHz}.

7. A method for supporting a narrow band communication in a base station, comprising:
   transmitting a first signaling; and
   transmitting a wireless signal on a target time frequency resource;
   wherein the first signaling indicates a first time frequency resource, the first time frequency resource comprises a second time frequency resource, the target time frequency resource comprises a time frequency resource of the first time frequency resource except the second time frequency resource, the target time frequency resource and the second time frequency resource are orthogonal or the first signaling indicates whether the target time frequency resource comprises the second time frequency resource, the first time frequency resource comprises T1 sub frames in a time domain, and comprises P1 sub carriers in a frequency domain, the second time frequency resource comprises T2 sub frames out of the T1 sub frames in a time domain, the T1 and the P1 are a positive integer respectively, and the T2 is smaller than the T1; the first signaling is a physical layer signaling, and the first signaling includes scheduling information of the wireless signal.

8. The method according to claim 7, wherein the method further comprises:
   transmitting a second signaling;
   wherein the second signaling indicates a third time frequency resource, the second time frequency resource is a part of the third time frequency resource, and the second signaling is a higher layer signaling.

9. The method according to claim 7, wherein the first signaling is a DCI used for downlink grant, and a transmission channel corresponding to the wireless signal is DL-SCH.

10. The method according to claim 7, wherein the method further comprises:
    receiving an uplink signal; and
    transmitting a first HARQ-ACK, and the first HARQ-ACK indicates whether the uplink signal is correctly decoded;
    wherein the first HARQ-ACK is transmitted in the second time frequency resource, or the first HARQ-ACK is transmitted in a third time frequency resource.

11. The method according to claim 7, wherein the first signaling indicates that the target time frequency resource does not comprise the second time frequency resource and the wireless signal adopts a rate matching scheme to avoid occupying the second time frequency resource.

12. The method according to claim 8, wherein the third time frequency resource comprises a sub resource periodically appeared in the time domain, and the second time frequency resource is a sub resource appeared once therein; or the base station selects that the second time frequency resource is at a time domain position of the third time frequency resource according to the given information, wherein the given information is at least one of the following:
    a current operation mode;
    a duplex mode;
    a transmission mode of an uplink signal; and
    a sub carrier gap of the uplink signal;

wherein the current operation mode means that the current adopted operation mode is one of {stand-alone operation, protection zone operation, in-band operation}; the duplex mode means that the current adopted duplex mode is one of {FDD, TDD}; the transmission mode of the uplink signal means that the transmission of the uplink signal is {single tone, multi tone}; the sub carrier gap of the uplink signal means that the sub carrier gap adopted by the uplink signal transmission is one of {3.75 kHz, 15 kHz}.

13. A user equipment for supporting a narrow band communication, comprising:

a second receiver configured to receive a first signaling, the second receiver including one or more of hardware and instructions stored in computer-readable storage media; and a third receiver configured to receive a wireless signal on a target time frequency resource, the third receiver including one or more of hardware and instructions stored in computer-readable storage media;

wherein the first signaling indicates a first time frequency resource, the first time frequency resource comprises a second time frequency resource, the target time frequency resource comprises a time frequency resource of the first time frequency resource except the second time frequency resource, the target time frequency resource and the second time frequency resource are orthogonal or the first signaling indicates whether the target time frequency resource comprises the second time frequency resource, the first time frequency resource comprises T1 sub frames in a time domain, and comprises P1 sub carriers in a frequency domain, the second time frequency resource comprises T2 sub frames out of the T1 sub frames in a time domain, the T1 and the P1 are a positive integer respectively, and the T2 is smaller than the T1; the first signaling is a physical layer signaling, and the first signaling includes scheduling information of the wireless signal.

14. The user equipment according to claim 11, wherein the second receiver is further configured to receive a second signaling, wherein the second signaling indicates a third time frequency resource, the second time frequency resource is a part of the third time frequency resource, and the second signaling is a higher layer signaling.

15. A base station equipment for supporting a narrow band communication, comprising:

a second transmitter configured to transmit a first signaling, the second transmitter including one or more of hardware and instructions stored in computer-readable storage media; and a third transmitter configured to transmit a wireless signal on a target time frequency resource, the third transmitter including one or more of hardware and instructions stored in computer-readable storage media;

wherein the first signaling indicates a first time frequency resource, the first time frequency resource comprises a second time frequency resource, the target time frequency resource comprises a time frequency resource of the first time frequency resource except the second time frequency resource, the target time frequency resource and the second time frequency resource are orthogonal or the first signaling indicates whether the target time frequency resource comprises the second time frequency resource, the first time frequency resource comprises T1 sub frames in a time domain, and comprises P1 sub carriers in a frequency domain, the second time frequency resource comprises T2 sub frames out of the T1 sub frames in a time domain, the T1 and the P1 are a positive integer respectively, and the T2 is smaller than the T1; the first signaling is a physical layer signaling, and the first signaling includes scheduling information of the wireless signal.

16. The base station equipment according to claim 15, wherein the first signaling indicates that the target time frequency resource does not comprise the second time frequency resource and the wireless signal adopts a rate matching scheme to avoid occupying the second time frequency resource.

* * * * *